(12) United States Patent
Holmes et al.

(10) Patent No.: US 6,292,722 B1
(45) Date of Patent: Sep. 18, 2001

(54) MAGNETIC TORQUER CONTROL WITH THRUSTER AUGMENTATION

(75) Inventors: Thomas J. Holmes, Portola Valley; David Cielaszyk, Mountain View, both of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/512,688

(22) Filed: Feb. 24, 2000

(51) Int. Cl.$^7$ ........................................... B64G 1/32
(52) U.S. Cl. ................................. 701/13; 244/166
(58) Field of Search ......................... 701/13; 244/164, 244/166, 171

(56) References Cited

U.S. PATENT DOCUMENTS

| | | | |
|---|---|---|---|
| 4,521,855 | * | 6/1985 | Lehner et al. ........................ 701/13 |
| 5,123,617 | * | 6/1992 | Linder et al. ........................ 244/166 |
| 5,130,931 | * | 7/1992 | Paluszek et al. ..................... 701/226 |
| 5,259,577 | * | 11/1993 | Achkar et al. ...................... 244/164 |
| 5,597,143 | * | 1/1997 | Surauer et al. ..................... 244/164 |
| 5,610,820 | * | 3/1997 | Shankar et al. ..................... 701/13 |
| 5,752,675 | * | 5/1998 | Holmes et al. ..................... 244/168 |
| 5,787,368 | * | 7/1998 | Gamble et al. ..................... 701/13 |
| 5,788,189 | * | 8/1998 | Iida ................................. 244/166 |
| 5,957,410 | * | 9/1999 | Bruederle et al. ................... 244/166 |

\* cited by examiner

*Primary Examiner*—Michael J. Zanelli
*Assistant Examiner*—Eric M Gibson
(74) *Attorney, Agent, or Firm*—Perman & Green, LLP

(57) ABSTRACT

Apparatus and a method is presented for controlling yaw and roll excursions in a spacecraft having on-board components such as magnetic torquers, a roll thruster, momentum wheels, a wheel controller, an earth sensor, and a Digital Integrating Rate Assembly (DIRA). An observer module on the spacecraft receives inputs containing information comprising the unbiased roll error from the earth sensor, yaw momentum measured from the wheel speeds, and commanded yaw and pitch momentum output from the wheel controller, and produces therefrom output signals indicative of yaw estimate, yaw momentum estimate and torque disturbances estimate. A controller module on the spacecraft receives the output signals and combines them with inputs containing information comprising minimum yaw error and roll thrust yaw controller gain and minimum yaw error and roll thrust yaw momentum controller gain, and produces therefrom a signal for commanding the operation of the magnetic torquers to change roll momentum when within the dead band of the signal and, alternatively, for commanding the operation of both the magnetic torquers and the roll thruster to change roll momentum when the threshold of the dead band is exceeded. By so doing, the yaw attitude and yaw excursions are controlled.

10 Claims, 2 Drawing Sheets

MAGNETIC TORQUER CONTROL WITH THRUSTER AUGMENTATION

BACKGROUND OF THE INVENTION

1. Field of the Invention

The present invention relates generally to control of orbiting spacecraft, especially for controlling spacecraft yaw and roll excursions caused by solar torques and thruster firings and, more particularly, for augmenting magnetic torquer management of solar torque with thruster availability in case larger than expected external torques are imparted on the spacecraft.

2. Description of the Prior Art

Earth-orbiting spacecraft, such as communications satellites, require orientation control to minimize excessive movements in pitch, yaw, and roll, that can effect their remaining in proper orbit, and that can interfere with their pointing in a proper direction to insure the reception of signals transmitted therefrom at receiving stations on the ground. Various systems are provided on the spacecraft to affect this control involving momentum wheels, thrusters, magnetic torquers, and sensors for yaw, roll, and pitch. For example, one such control system uses momentum bias for preventing the set yaw orientation from drifting. However, the spacecraft is regularly undergoing disturbances, from such factors as solar torques and thruster firings, that can cause variations in the yaw angle from the desired orientation and beyond allowable ranges of operation. The current approach to dealing with this problem uses a combination of the yaw sensors and magnetic torquers to maintain the desired yaw orientation.

Unfortunately, there are variations in the earth's magnetic field and, indeed, it even disappears on occasion rendering the magnetic torquers less effective or even totally ineffective. Furthermore, there are often disturbances on the spacecraft itself which affect the capability of the magnetic torquers. For example, magnetic torquers are known to interact adversely with solar torques and with the B-Field, that is, the earth's magnetic field. Still another drawback of known systems is that when a maneuver is performed by the spacecraft, torque disturbances are thereby imparted to the spacecraft which are often sensed by the computer as a solar torque or a B-field anomaly. To avoid excessive correctional operations by the magnetic torquers under the direction of the on-board computer, it is therefore often necessary to temporarily disable the magnetic torquers, sometimes for an extended duration.

It was with knowledge of the foregoing state of the technology that the present invention has been conceived and is now reduced to practice. The actuation and deployment concept embodied by this invention is different from all of the devices reviewed above.

SUMMARY OF THE INVENTION

The present invention relates to an apparatus and method for controlling yaw and roll excursions in a spacecraft having on-board components such as magnetic torquers, a roll thruster, momentum wheels, a wheel controller, an earth sensor, and a Digital Integrating Rate Assembly (DIRA). An observer module on the spacecraft receives inputs containing information comprising the unbiased roll error from the earth sensor, yaw momentum measured from the wheel speeds, and commanded yaw and pitch momentum output from the wheel controller, and produces therefrom output signals indicative of yaw estimate, yaw momentum estimate and torque disturbances estimate. A controller module on the spacecraft receives the output signals and combines them with inputs containing information comprising minimum yaw error and roll thrust yaw controller gain and minimum yaw error and roll thrust yaw momentum controller gain, and produces therefrom a signal for commanding the operation of the magnetic torquers to change roll momentum when within the dead band of the signal and, alternatively, for commanding the operation of both the magnetic torquers and the roll thruster to change roll momentum when the threshold of the dead band is exceeded. By so doing, the yaw attitude and yaw excursions are controlled.

A primary feature, then, of the present invention is the provision of a spacecraft control system in which magnetic torquers and thrusters are in active control simultaneously.

Advantages of the system of the invention over known prior art include the following:

(1) it manages momentum with larger than expected momentum disturbances;

(2) it manages momentum with magnetic torquer failure;

(3) it manages momentum through magnetic storms;

(4) it can operate through thruster unloads;

(5) it can operate through EW stationkeeping maneuvers;

(6) it can operate through NS stationkeeping maneuvers;

(7) it can operate through fuel slosh momentum shifts;

(8) it can operate through initial on-orbit out-gassing events;

(9) it only fires thrusters in extenuating circumstances;

(10) it fires thrusters without operator intervention; and

(11) it manages wheel speed run off with magnetic torquers.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

Figure 1:
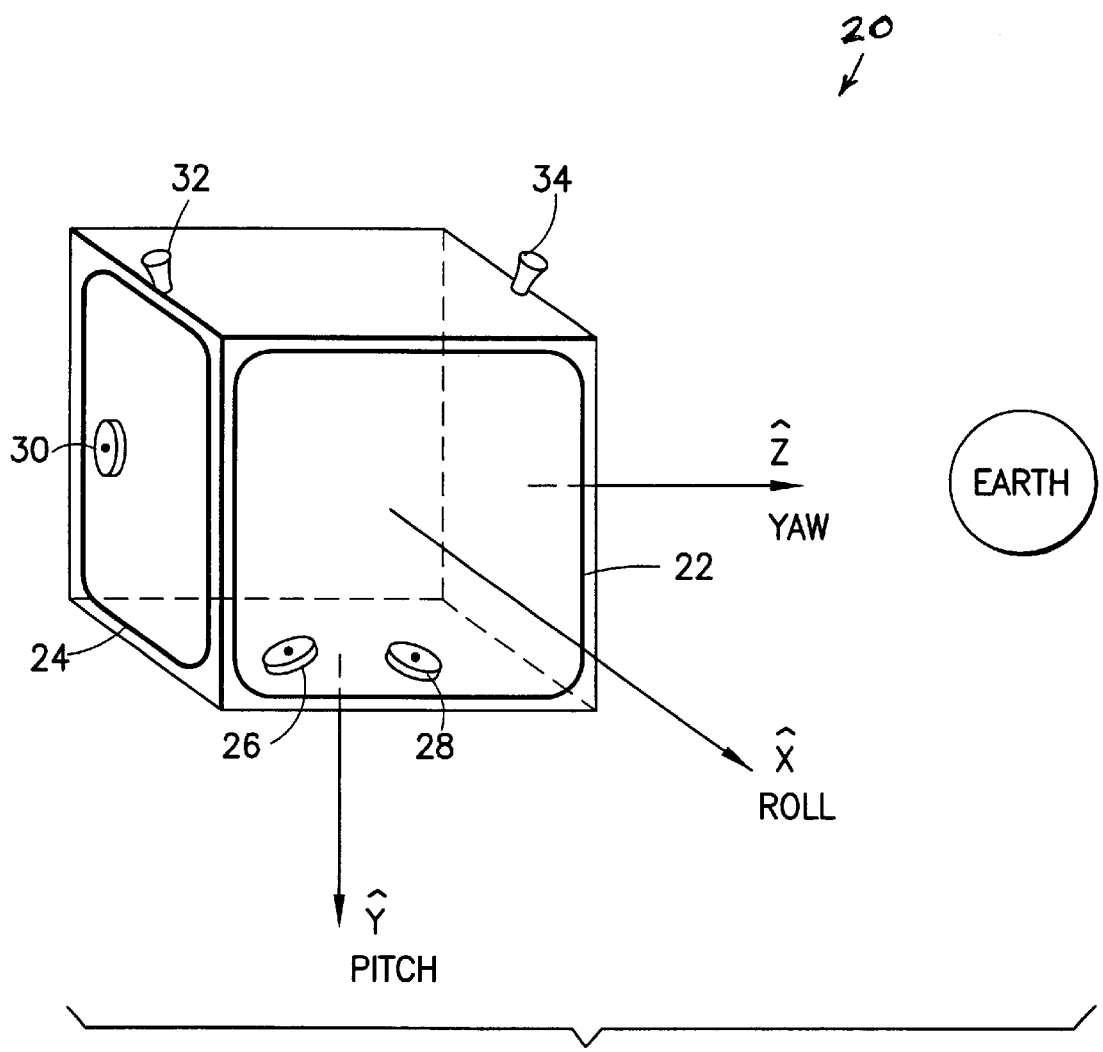
FIG. 1 is a diagrammatic perspective view generally illustrating an earth-orbiting spacecraft embodying the invention.

Turn now to the drawings and, initially, to FIG. 1 which generally illustrates an earth-orbiting spacecraft 20 embodying the invention. Earth-orbiting spacecraft, such as communications satellites, on-board systems, that are monitored and commanded by ground observers, are provided for controlling the craft's orientation in pitch, roll, and yaw, about respective x (roll), y (Pitch), and z (yaw) axes. These on-board systems maintain the craft in proper orbit and point it in a desired direction to maximize the reception of signals transmitted therefrom to earth-based receiving stations. A typical system includes orientation sensing components and means for adjusting the orientation of the craft including magnetic torquers 22, 24, momentum wheels 26, 28, 30, and thrusters 32, 34, which alter and unload unwanted momentum resulting from imposed forces from solar torque, thruster firing, fuel shift, and such.

Figure 2:
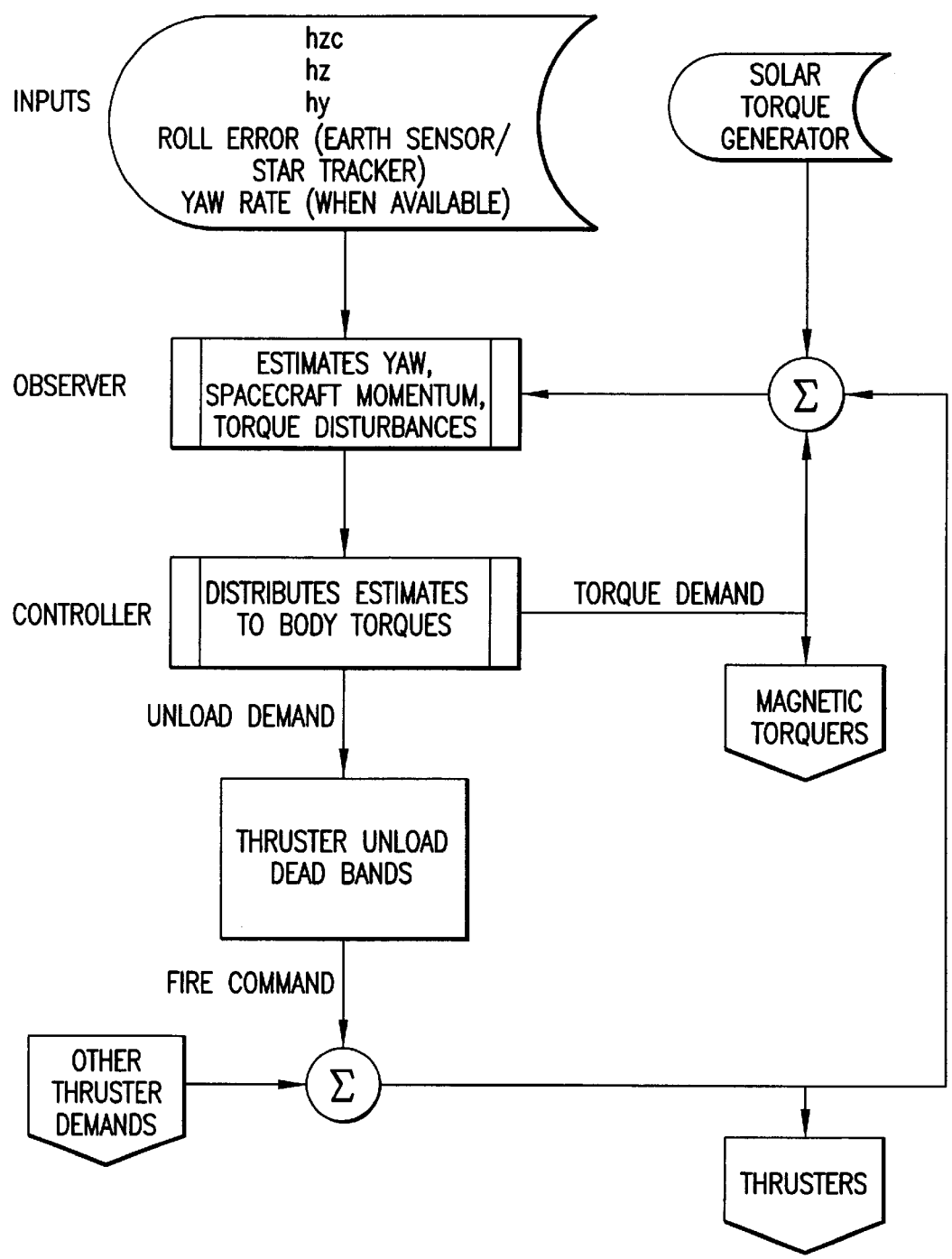
FIG. 2 is a flow diagram which generally presents the method of the invention, namely, the process to augment magnetic torquers with thruster control.

FIG. 2 is a flow diagram which presents the method of the invention, namely, the process to augment magnetic torquers with thruster control. The inputs include:

(1) hzc: hz command from the wheel control loop;

(2) hz: yaw momentum in the wheels derived from the wheel speeds;

(3) hy: pitch momentum in the wheels derived from the wheel speeds;

(4) Roll error: Spacecraft roll error from gyro, earth sensor or star tracker;

(5) Yaw rate: Spacecraft yaw rate from gyro when available;

(6) Torques: Totals from solar torque generator and expected response from the thruster firings and magnetic torquer outputs.

One example of implementing the invention could be performed as follows, that is, an observer module which uses the spacecraft dynamic equations of motion corrected by the above inputs to estimate spacecraft yaw angle and momentum. The linearized spacecraft dynamic equations of motion used in the observer module may be stated as follows:

$$\begin{bmatrix} \dot{\hat{\Phi}} \\ \dot{\hat{\Psi}} \\ \dot{\hat{H}}_x \\ \dot{\hat{H}}_z \\ \dot{\hat{h}}_z \\ \dot{\Delta \hat{h}}_{zc} \\ \dot{\hat{\Psi}}_{bias} \end{bmatrix} = \begin{bmatrix} 0 & \omega_0 & \frac{1}{I_x} & 0 & 0 & 0 & 0 \\ -\omega_0 & 0 & 0 & \frac{1}{I_z} & 0 & 0 & 0 \\ g_x & 0 & 0 & \Gamma_z & \omega_0 & 0 & 0 \\ 0 & 0 & \Gamma_x & 0 & \frac{1}{\tau} & \frac{1}{\tau} & 0 \\ 0 & 0 & 0 & 0 & -\frac{1}{\tau} & -\frac{1}{\tau} & 0 \\ 0 & 0 & 0 & 0 & 0 & 0 & 0 \\ 0 & 0 & 0 & 0 & 0 & 0 & 0 \end{bmatrix} \begin{bmatrix} \hat{\Phi} \\ \hat{\Psi} \\ \hat{H}_x \\ \hat{H}_z \\ \hat{h}_z \\ \Delta \hat{h}_{zc} \\ \hat{\Psi}_{bias} \end{bmatrix} +$$

$$[L] \begin{bmatrix} \Phi_{ES} - \hat{\Phi} \\ h_{ztach} - \hat{h}_z \\ \Psi_{DIRA} - \hat{\Psi}_{bias} - \frac{\hat{H}_z}{I_z} \end{bmatrix} + \begin{bmatrix} 0 & 0 & 0 \\ 0 & 0 & 0 \\ 1 & 0 & 0 \\ 0 & 1 & -\frac{1}{\tau} \\ 0 & 0 & \frac{1}{\tau} \\ 0 & 0 & 0 \\ 0 & 0 & 0 \end{bmatrix} \begin{bmatrix} T_x \\ T_z \\ h_{zc} \end{bmatrix}$$

$$g_x = -3\omega_0^2(I_y - I_z) \quad \Gamma_x = \frac{h_n + \omega_0(I_y - I_x)}{I_x};$$

$$\Gamma_z = \frac{h_n + \omega_0(I_y - I_z)}{I_z}; \quad L = \begin{bmatrix} L_{11} & 0 & 0 \\ L_{21} & 0 & L_{23} \\ L_{31} & 0 & L_{33} \\ L_{41} & 0 & L_{43} \\ 0 & L_{52} & 0 \\ 0 & L_{62} & 0 \\ L_{71} & 0 & L_{73} \end{bmatrix}$$

where the terms are as defined in Table 1 below.

TABLE 1

| | | Observer Parameters |
|---|---|---|
| $\hat{\Phi}$ | rad | Roll estimate |
| $\hat{\Psi}$ | rad | Yaw estimate |
| $\hat{H}_x$ | Nms | Roll momentum estimate |
| $\hat{H}_z$ | Nms | Yaw momentum estimate |
| $\hat{h}_z$ | Nms | Yaw momemtnum estimate from the wheels |
| $\Delta \hat{h}_{zc}$ | Nms | Estimate of wheel yaw momentum command offset |
| $\hat{\Psi}$ bias | rad/sec | Estimate of DIRA yaw rate drift |
| $\omega 0$ | rad/sec | Sidereal orbit rate (~7.29217e−5) |
| $I_x$ | Kg-m$^2$ | Spacecraft roll inertia |
| $I_y$ | Kg-m$^2$ | Spacecraft pitch inertia |
| $I_z$ | Kg-m$^2$ | Spacecraft yaw inertia |
| $h_n$ | Nms | Nominal pitch momentum bias from the wheel speeds |
| $\tau$ | sec | Wheel torque time constant |
| $\Phi$ ES | rad | Unbiased roll error from the ES |
| $h_{ztach}$ | Nms | Yaw momentum measured from the wheel speeds |
| $\psi$ DIRA | rad/sec | Yaw rate from the DIRA |
| $T_x$ | Nm | Roll torque form solar torque or thruster firings |
| $T_z$ | Nm | Yaw torque from solar torque or thruster firings |
| $h_{zc}$ | Nms | Commanded hz output from the wheel controller |
| L | various | Reduced set of optimal steady-state Kalman gains |

The controller (FIG. 2) applies a set of stabilized gains to the estimates established by the spacecraft dynamic equations of motion to provide demands from the torquers and thrusters. Under normal operations, the torquers maintain the spacecraft momentum, while the thrusters sit idle as their demands will be within the dead bands of the signals calling for a suitable correction and no firing commands will be issued.

Under anomalous conditions, however, the unload demand will exceed the thresholds of the dead band, and the thruster firings will bring the spacecraft momentum back to within nominal operating conditions which the torquers were not capable of. The torquers will continue to operate even with these thruster firings, because the observer module is tracking the unloads. This means that orbital maneuvers will not require the observer to be shut down, because it has the ongoing activities of the thrusters taken into account. Typically, gyros are available during maneuvers, which provide corrections to the expected thruster activities. The gyros also allow the magnetic torquers to continue operating during the residual fuel slosh momentum transfer following maneuvers. Prior art sometimes requires that magnetic torquer operations be shut down for up to two days following an attitude change maneuver. This invention allows the momentum management to continue immediately after a maneuver.

While the term "deadband" can mean comparing the value of the attitude angle against a simple constant threshold, the definition also includes more complex implementations. For example, instead of checking the value of the attitude angle, the value of the weighted sum of the attitude angle and attitude rate could be checked. Another example would replace the simple constant threshold with a more-complex threshold such as a Schmidt trigger.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Apparatus for controlling yaw and roll excursions in a spacecraft having on-board components including at least some of magnetic torquers, a roll thruster, momentum wheels, a wheel controller, an earth sensor, and a Digital Integrating Rate Assembly (DIRA) comprising:

observer means on the spacecraft for receiving input signals containing information comprising the unbiased roll error from the earth sensor, yaw momentum measured from the wheel speeds, and commanded yaw and pitch momentum output from the wheel controller, and producing therefrom output signals indicative of yaw estimate, yaw momentum estimate and torque disturbances estimate; and controller means on the spacecraft for receiving said output signals and combining them with inputs containing information comprising minimum yaw error and roll thrust yaw controller gain and minimum yaw error and roll thrust yaw momentum controller gain, and producing therefrom a signal for commanding the operation of the magnetic torquers to change roll momentum when within the dead band of the signal and for commanding the operation of both the magnetic torquers and the roll thruster to change roll momentum when the threshold of the dead band is exceeded, whereby the yaw attitude and yaw excursions are controlled.

2. Apparatus as set forth in claim 1 wherein said observer means further comprises means for receiving an input containing information indicative of yaw rate from the DIRA when available.

3. Apparatus as set forth in claim 1 including:
means for providing input signals indicative of roll and yaw momentum changes to said observer means, wherein said input signals are indicative of roll and yaw momentum increases due to solar torques and expected response from the thruster firings and magnetic torquer outputs.

4. Apparatus as set forth in claim 1 wherein said observer means employs the following spacecraft dynamic equations of motion, as corrected:

$$\begin{bmatrix} \hat{\Phi} \\ \hat{\Psi} \\ \hat{H}_x \\ \hat{H}_z \\ \hat{h}_z \\ \Delta \hat{h}_{zc} \\ \hat{\Psi}_{bias} \end{bmatrix} = \begin{bmatrix} 0 & \omega_0 & \frac{1}{I_x} & 0 & 0 & 0 & 0 \\ -\omega_0 & 0 & 0 & \frac{1}{I_z} & 0 & 0 & 0 \\ g_x & 0 & 0 & \Gamma_z & \omega_0 & 0 & 0 \\ 0 & 0 & \Gamma_x & 0 & \frac{1}{\tau} & \frac{1}{\tau} & 0 \\ 0 & 0 & 0 & 0 & -\frac{1}{\tau} & -\frac{1}{\tau} & 0 \\ 0 & 0 & 0 & 0 & 0 & 0 & 0 \\ 0 & 0 & 0 & 0 & 0 & 0 & 0 \end{bmatrix} \begin{bmatrix} \hat{\Phi} \\ \hat{\Psi} \\ \hat{H}_x \\ \hat{H}_z \\ \hat{h}_z \\ \Delta \hat{h}_{zc} \\ \hat{\Psi}_{bias} \end{bmatrix} +$$

$$[L] \begin{bmatrix} \Phi_{ES} - \hat{\Phi} \\ h_{ztach} - \hat{h}_z \\ \Psi_{DIRA} - \hat{\Psi}_{bias} - \frac{\hat{H}_z}{I_z} \end{bmatrix} + \begin{bmatrix} 0 & 0 & 0 \\ 0 & 0 & 0 \\ 1 & 0 & 0 \\ 0 & 1 & -\frac{1}{\tau} \\ 0 & 0 & \frac{1}{\tau} \\ 0 & 0 & 0 \\ 0 & 0 & 0 \end{bmatrix} \begin{bmatrix} T_x \\ T_z \\ h_{zc} \end{bmatrix}$$

$$g_x = -3\omega_0^2(I_y - I_z) \quad \Gamma_x = \frac{h_n + \omega_0(I_y - I_x)}{I_x};$$

$$\Gamma_z = \frac{h_n + \omega_0(I_y - I_z)}{I_z};$$

$$L = \begin{bmatrix} L_{11} & 0 & 0 \\ L_{21} & 0 & L_{23} \\ L_{31} & 0 & L_{33} \\ L_{41} & 0 & L_{43} \\ 0 & L_{52} & 0 \\ 0 & L_{62} & 0 \\ L_{71} & 0 & L_{73} \end{bmatrix}$$

for providing said output signals where the terms are defined as follows:

| | | |
|---|---|---|
| $\hat{\Phi}$ | rad | Roll estimate |
| $\hat{\Psi}$ | rad | Yaw estimate |
| $\hat{H}_x$ | Nms | Roll momentum estimate |
| $\hat{H}_z$ | Nms | Yaw momentum estimate |
| $\hat{h}_z$ | Nms | Yaw momemtnum estimate from the wheels |
| $\Delta \hat{h}_{zc}$ | Nms | Estimate of wheel yaw momentum command offset |
| $\hat{\Psi}$ bias | rad/sec | Estimate of DIRA yaw rate drift |
| $\omega 0$ | rad/sec | Sidereal orbit rate (~7.29217e-5) |
| $I_x$ | Kg-m$^2$ | Spacecraft roll inertia |
| $I_y$ | Kg-m$^2$ | Spacecraft pitch inertia |
| $I_z$ | Kg-m$^2$ | Spacecraft yaw inertia |
| $h_n$ | Nms | Nominal pitch momentum bias from the wheel speeds |
| $\tau$ | sec | Wheel torque time constant |
| $\Phi$ ES | rad | Unbiased roll error from the ES |
| $h_{ztach}$ | Nms | Yaw momentum measured from the wheel speeds |
| $\Psi$ DIRA | rad/sec | Yaw rate from the DIRA |
| $T_x$ | Nm | Roll torque form solar torque or thruster firings |
| $T_z$ | Nm | Yaw torque from solar torque or thruster firings |
| $h_{zc}$ | Nms | Commanded hz output from the wheel controller |
| L | various | Reduced set of optimal steady-state Kalman gains |

5. A method for controlling yaw and roll excursions in spacecraft having on-board components including at least some of magnetic torquers, a roll thruster, momentum wheels, a wheel controller, an earth sensor, and a Digital Integrating Rate Assembly (DIRA) comprising the steps of:

receiving input signals containing information comprising the unbiased roll error from the earth sensor, yaw and pitch momentum measured from the wheel speeds, and commanded yaw momentum output from the wheel controller;

producing from said input signals output signals indicative of yaw estimate, yaw momentum estimate and torque disturbances output; and combining said output signals with a minimum yaw error and roll thrust yaw controller gain and a minimum yaw error and roll thrust yaw momentum controller gain, and producing therefrom a signal for commanding the operation of the magnetic torquers to change roll momentum when within the dead band of the signal and for commanding the operation of both the magnetic torquers and the roll thruster to change roll momentum when the threshold of the dead band is exceeded, whereby the yaw attitude and yaw excursions are controlled.

6. A method as set forth in claim 5 wherein said input signals include a signal containing information indicative of yaw rate from the DIRA when available.

7. A method as set forth in claim 5 wherein said input signals include information indicative of roll and yaw momentum changes due to solar torques and expected response from the thruster firings and magnetic torquer outputs.

8. A method as set forth in claim 5 wherein the input signals are defined by the following spacecraft dynamic equations of motion, as corrected:

$$\begin{bmatrix} \hat{\Phi} \\ \hat{\Psi} \\ \hat{H}_x \\ \hat{H}_z \\ \hat{h}_z \\ \Delta \hat{h}_{zc} \\ \hat{\Psi}_{bias} \end{bmatrix} = \begin{bmatrix} 0 & \omega_0 & \frac{1}{I_x} & 0 & 0 & 0 & 0 \\ -\omega_0 & 0 & 0 & \frac{1}{I_z} & 0 & 0 & 0 \\ g_x & 0 & 0 & \Gamma_z & \omega_0 & 0 & 0 \\ 0 & 0 & \Gamma_x & 0 & \frac{1}{\tau} & \frac{1}{\tau} & 0 \\ 0 & 0 & 0 & 0 & -\frac{1}{\tau} & -\frac{1}{\tau} & 0 \\ 0 & 0 & 0 & 0 & 0 & 0 & 0 \\ 0 & 0 & 0 & 0 & 0 & 0 & 0 \end{bmatrix} \begin{bmatrix} \hat{\Phi} \\ \hat{\Psi} \\ \hat{H}_x \\ \hat{H}_z \\ \hat{h}_z \\ \Delta \hat{h}_{zc} \\ \hat{\Psi}_{bias} \end{bmatrix} +$$

$$[L] \begin{bmatrix} \Phi_{ES} - \hat{\Phi} \\ h_{ztach} - \hat{h}_z \\ \Psi_{DIRA} - \hat{\Psi}_{bias} - \frac{H_z}{I_z} \end{bmatrix} + \begin{bmatrix} 0 & 0 & 0 \\ 0 & 0 & 0 \\ 1 & 0 & 0 \\ 0 & 1 & -\frac{1}{\tau} \\ 0 & 0 & \frac{1}{\tau} \\ 0 & 0 & 0 \\ 0 & 0 & 0 \end{bmatrix} \begin{bmatrix} T_x \\ T_z \\ h_{zc} \end{bmatrix}$$

$$g_x = -3\omega_0^2(I_y - I_z) \quad \Gamma_x = \frac{h_n + \omega_0(I_y - I_x)}{I_x};$$

$$\Gamma_z = \frac{h_n + \omega_0(I_y - I_z)}{I_z};$$

$$L = \begin{bmatrix} L_{11} & 0 & 0 \\ L_{21} & 0 & L_{23} \\ L_{31} & 0 & L_{33} \\ L_{41} & 0 & L_{43} \\ 0 & L_{52} & 0 \\ 0 & L_{62} & 0 \\ L_{71} & 0 & L_{73} \end{bmatrix}$$

where the terms are those defined as follows:

| Observer Parameters | | |
|---|---|---|
| $\hat{\Phi}$ | rad | Roll estimate |
| $\hat{\Psi}$ | rad | Yaw estimate |
| $\hat{H}_x$ | Nms | Roll momentum estimate |
| $\hat{H}_z$ | Nms | Yaw momentum estimate |
| $\hat{h}_z$ | Nms | Yaw momemtnum estimate from the wheels |
| $\Delta \hat{h}_{zc}$ | Nms | Estimate of wheel yaw momentum command offset |
| $\hat{\Psi}$ bias | rad/sec | Estimate of DIRA yaw rate drift |
| ω0 | rad/sec | Sidereal orbit rate (~7.29217e-5) |
| $I_x$ | Kg-m² | Spacecraft roll inertia |
| $I_y$ | Kg-m² | Spacecraft pitch inertia |
| $I_z$ | Kg-m² | Spacecraft yaw inertia |
| $h_n$ | Nms | Nominal pitch momentum bias from the wheel speeds |
| τ | sec | Wheel torque time constant |
| Φ ES | rad | Unbiased roll error from the ES |
| $h_{ztach}$ | Nms | Yaw momentum measured from the wheel speeds |
| ψ DIRA | rad/sec | Yaw rate from the DIRA |
| $T_x$ | Nm | Roll torque form solar torque or thruster firings |
| $T_z$ | Nm | Yaw torque from solar torque or thruster firings |
| $h_{zc}$ | Nms | Commanded hz output from the wheel controller |
| L | various | Reduced set of optimal steady-state Kalman gains |

9. A system for controlling yaw and roll excursions in a spacecraft having on-board components including at least some of magnetic torquers, a roll thruster, momentum wheels, a wheel controller, an earth sensor, and a Digital Integrating Rate Assembly (DIRA) comprising:

means on the spacecraft for producing input signals indicative of roll and yaw momentum increases due to solar torques or thruster firings;

observer means on the spacecraft for receiving said input signals containing information comprising the unbiased roll error from the earth sensor, yaw and pitch momentum measured from the wheel speeds, and commanded yaw momentum output from the wheel controller, and producing therefrom output signals indicative of the yaw estimate, the yaw momentum estimate and torque disturbances estimate; and controller means on the spacecraft for receiving said output signals and combining said yaw estimate output signal with a signal indicative of minimum yaw error and roll thrust yaw controller gain and combining said yaw momentum estimate output signal after dead banding with a signal indicative of minimum yaw error and roll thrust yaw momentum controller gain, and producing from a combination of said combinings a signal for commanding the operation of the magnetic torquers to change roll momentum when within the dead band of the signal and for commanding the operation of both the magnetic torquers and the roll thruster to change roll momentum when the threshold of the dead band is exceeded, whereby the yaw attitude and yaw excursions are controlled.

10. A system as set forth in claim 9 wherein said observer means employs the following spacecraft dynamic equations of motion, as corrected:

$$\begin{bmatrix} \hat{\Phi} \\ \hat{\Psi} \\ \hat{H}_x \\ \hat{H}_z \\ \hat{h}_z \\ \Delta \hat{h}_{zc} \\ \hat{\Psi}_{bias} \end{bmatrix} = \begin{bmatrix} 0 & \omega_0 & \frac{1}{I_x} & 0 & 0 & 0 & 0 \\ -\omega_0 & 0 & 0 & \frac{1}{I_z} & 0 & 0 & 0 \\ g_x & 0 & 0 & \Gamma_z & \omega_0 & 0 & 0 \\ 0 & 0 & \Gamma_x & 0 & \frac{1}{\tau} & \frac{1}{\tau} & 0 \\ 0 & 0 & 0 & 0 & -\frac{1}{\tau} & -\frac{1}{\tau} & 0 \\ 0 & 0 & 0 & 0 & 0 & 0 & 0 \\ 0 & 0 & 0 & 0 & 0 & 0 & 0 \end{bmatrix} \begin{bmatrix} \hat{\Phi} \\ \hat{\Psi} \\ \hat{H}_x \\ \hat{H}_z \\ \hat{h}_z \\ \Delta \hat{h}_{zc} \\ \hat{\Psi}_{bias} \end{bmatrix} +$$

$$[L] \begin{bmatrix} \Phi_{ES} - \hat{\Phi} \\ h_{ztach} - \hat{h}_z \\ \Psi_{DIRA} - \hat{\Psi}_{bias} - \frac{H_z}{I_z} \end{bmatrix} + \begin{bmatrix} 0 & 0 & 0 \\ 0 & 0 & 0 \\ 1 & 0 & 0 \\ 0 & 1 & -\frac{1}{\tau} \\ 0 & 0 & \frac{1}{\tau} \\ 0 & 0 & 0 \\ 0 & 0 & 0 \end{bmatrix} \begin{bmatrix} T_x \\ T_z \\ h_{zc} \end{bmatrix}$$

$$g_x = -3\omega_0^2(I_y - I_z) \quad \Gamma_x = \frac{h_n + \omega_0(I_y - I_x)}{I_x};$$

$$\Gamma_z = \frac{h_n + \omega_0(I_y - I_z)}{I_z};$$

$$L = \begin{bmatrix} L_{11} & 0 & 0 \\ L_{21} & 0 & L_{23} \\ L_{31} & 0 & L_{33} \\ L_{41} & 0 & L_{43} \\ 0 & L_{52} & 0 \\ 0 & L_{62} & 0 \\ L_{71} & 0 & L_{73} \end{bmatrix}$$

for providing said output signals where the terms are defined as

| Observer Parameters | | |
|---|---|---|
| $\hat{\Phi}$ | rad | Roll estimate |
| $\hat{\psi}$ | rad | Yaw estimate |
| $\hat{H}_x$ | Nms | Roll momentum estimate |
| $\hat{H}_z$ | Nms | Yaw momentum estimate |
| $\hat{h}_z$ | Nms | Yaw momemtnum estimate from the wheels |
| $\Delta\hat{h}_{zc}$ | Nms | Estimate of wheel yaw momentum command offset |
| $\hat{\Psi}$ bias | rad/sec | Estimate of DIRA yaw rate drift |
| $\omega 0$ | rad/sec | Sidereal orbit rate (~7.29217e−5) |
| $I_x$ | Kg-m² | Spacecraft roll inertia |
| $I_y$ | Kg-m² | Spacecraft pitch inertia |
| $I_z$ | Kg-m² | Spacecraft yaw inertia |
| $h_n$ | Nms | Nominal pitch momentum bias from the wheel speeds |
| $\tau$ | sec | Wheel torque time constant |
| $\Phi$ ES | rad | Unbiased roll error from the ES |
| $h_{ztach}$ | Nms | Yaw momentum measured from the wheel speeds |
| $\psi$ DIRA | rad/sec | Yaw rate from the DIRA |
| $T_x$ | Nm | Roll torque form solar torque or thruster firings |
| $T_z$ | Nm | Yaw torque from solar torque or thruster firings |
| $h_{zc}$ | Nms | Commanded hz output from the wheel controller |
| L | various | Reduced set of optimal steady-state Kalman gains |

\* \* \* \* \*